June 26, 1956 — A. E. FLETCHER — 2,752,175
SHAFT SEAL
Original Filed Feb. 9, 1950
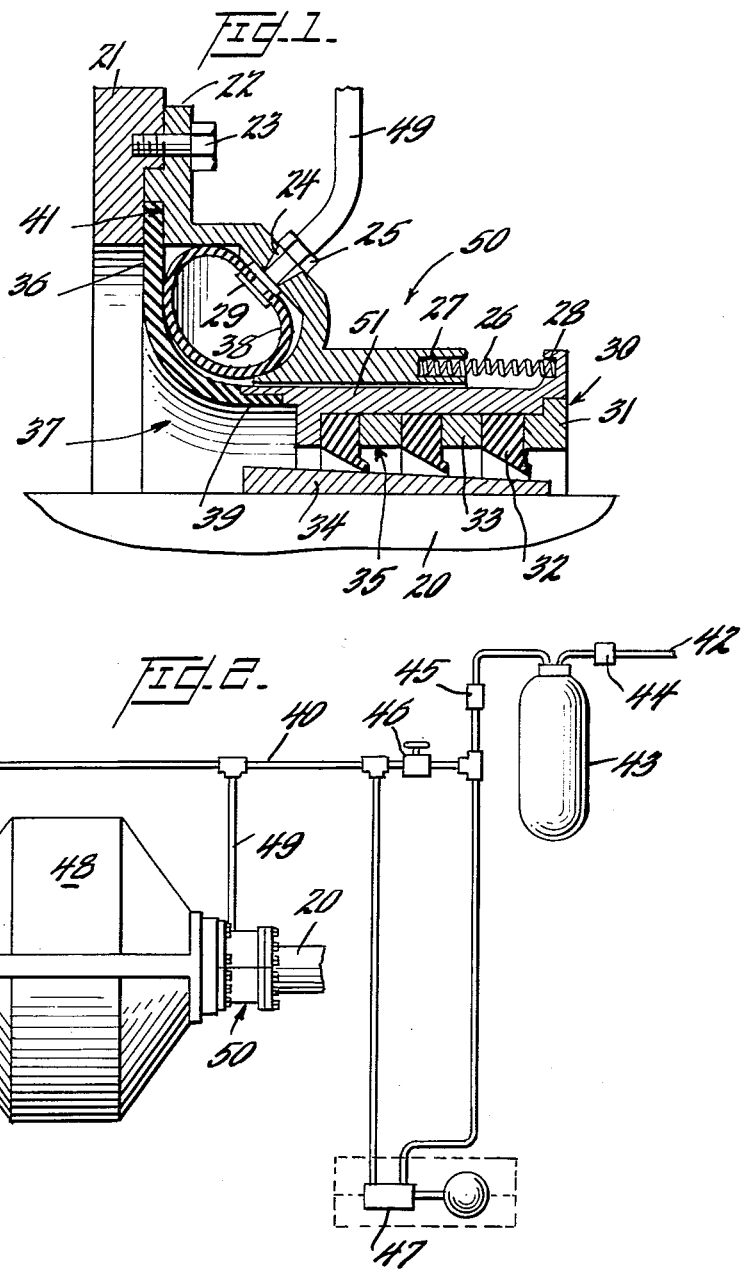
INVENTOR
Albert E. Fletcher,
BY George Lipkin
B. L. Zangwill
ATTORNEY ic Office 2,752,175
Patented June 26, 1956

2,752,175

SHAFT SEAL

Albert E. Fletcher, North Arlington, Va.

Original application February 9, 1950, Serial No. 143,289, now Patent No. 2,719,737, dated October 4, 1955. Divided and this application June 8, 1955, Serial No. 514,137

5 Claims. (Cl. 286—9)

(Granted under Title 35, U. S. Code (1952), sec. 266)

The invention described herein may be manufactured and used by or for the Government of the United States of America for governmental purposes without the payment of any royalties thereon or therefor.

This application is a division of applicant's copending application Serial No. 143,289, filed February 9, 1950, now Patent No. 2,719,737, issued October 4, 1955.

The invention relates to a shaft seal and more particularly to a seal selectively engageable with a shaft for preventing the entry of a fluid medium into the working parts of apparatus.

Shaft seals of the prior art are designed for maintaining either frictional contact with the shaft or supplying a continuous flow of sealing medium thereto for precluding damage to equipment incorporating these fluid type seals.

The disadvantage of the frictional type seals is that there is a measurable loss of power caused by energy expended in overcoming the drag of the seal. Excessive wear causing frequent replacement of packing or sealing rings results with consequent replacement of parts being necessary at times when the equipment is needed for operation.

The objectionable feature of fluid type seals is that some part of sealing elements must be in contact with the shaft surface thereby also resulting in wear and additionally posing design problems associated with maintaining a fluid-tight fit with the shaft.

It is therefore an object of the invention to provide a seal selectively engageable with a rotatable member.

Another object of the invention is the provision of a seal actuated by a resilient device for engaging a rotatable shaft.

Still another object of the invention is the provision of an automatic device coacting with a shaft seal for preventing passage of fluid past the seal.

A further object of the invention is the provision of a pneumatic device cooperating with sealing rings for causing the latter to engage a member attached to a rotating shaft.

Other objects and many of the attendant advantages of this invention will be readily appreciated as the same becomes better understood by reference to the following detailed description when considered in connection with the accompanying drawings wherein:

Fig. 1 is a view in elevation, partly in section, showing a shaft seal in normal position when used in the system of Fig. 2; and Fig. 2 is a diagrammatic view of a preferred pneumatic system for achieving automatic operation of the shaft seal of this invention.

Referring now to the drawings, wherein like reference characters designate like or corresponding parts throughout the several views, there is shown in Fig. 1 a shaft seal 50 positioned over a shaft 20 extending longitudinally through a bulkhead 21. The shaft seal 50 comprises a housing 22 shaped in the form of a cylinder which fits over shaft 20 and is attached to bulkhead 21 by means of bolts 23. As shown in Fig. 2 the shaft seal housing is split into two parts for facilitating installation of the seal on shaft 20. A single bored opening 24 formed in a side of housing 22 receives an air supply pipe 49 which is secured in place by a lock nut or fitting 25. An elastic annular diaphragm 36, made of rubber or other flexible material, is fixed at one end between bulkhead 21 and housing 22, and is bonded at its other end to a slide ring 51. The slide ring encompasses shaft 20 and is provided with a plurality of spacer rings 33 which serve to space and support a series of concentric seal rings 32. The slide ring 51 and attached rings 32 reciprocate longitudinally of shaft 20 and the rings form a fluid-tight fit with wedge ring 34 when forced into engagement therewith. The wedge ring 34 is shaped in the form of a right circular cone and is rigidly affixed to the peripheral surface of shaft 20.

The outermost ring 32 of the apparatus is maintained in position by a retainer ring 31. The end of slide ring 51 protruding beyond housing 22 is provided with an outwardly extending flange having a groove 28 formed in the surface thereof for receiving a plurality of springs 26. The other end of springs 26 fit into a similar groove 27 formed in the wall of housing 22 and are placed under compression for biasing slide ring 51 outwardly of the housing. An elastic tube 38 of rubber or similar material, is positioned between the annular diaphragm 36 and an inner portion of housing 22 and is inflated through a single opening provided with air from pipe 49.

Referring now to Fig. 2, there is shown a pneumatic system for controlling operation of shaft seal 50 for preventing entry of a fluid medium into the operating equipment generally designated as 48. The equipment shown consists of a gear assembly having seals 50 positioned at each end thereof and surrounding shaft 20 extending longitudinally through the gear assembly housing. It is to be understood however, that the seals are not limited to the structure illustrated but may be applied to any apparatus requiring sealing devices, such as where a rotating shaft passes through a vertical partition separating adjacent compartments.

The system consists of an air supply pipe 42 providing air to an air flask 43 and having interposed therebetween, a check or non-return valve 44 for preventing escape of air from the flask to the source of air supply. A pressure regulator valve 45 is inserted in the line extending from the air flask for supplying air to the system at a predetermined pressure. As shown in Fig. 2, the supply line divides into a pair of parallel passageways, each respectively including a manually operable valve 46 and a float valve 47, the latter being adapted for positioning in the bilges of a ship housing the equipment 48. Air is then directed through line 40 and each of pipes 49 to a pair of shaft seals 50 positioned on each end of the gear assembly housing.

Assuming that a compartment is flooding or that it is otherwise desirable to prevent entry of fluid into apparatus 48, air is supplied through manual valve 46 or through float operated valve 47 positioned in the bilges of a ship. In either event, the air inflates elastic tube 38 causing it to move elastic diaphragm 36 to the left as shown in Fig. 1. Movement of the diaphragm in this direction, carries slide ring 51 and attached seal rings 32 into contact with wedge ring 34 for forming a fluid-tight fit therewith. Such movement of the diaphragm and slide ring compresses springs 26, thereby storing energy for moving the slide ring and attached seal rings out of contact with the wedge ring upon removal of air from elastic tube 38. Upon removal or venting of air from the elastic tube, the pressure against diaphragm 36 is relieved thereby permitting springs 26 to move the seal rings 32 out of engagement with wedge ring 34. At this time, contact between the seal rings and the shaft is completely broken and the shaft is allowed to rotate without being subjected to the normal drag caused by the seal rings.

Obviously many modifications and variations of the present invention are possible in the light of the above teachings. It is therefore to be understood that within the scope of the appended claims the invention may be practiced otherwise than as specifically described.

What is claimed is:

1. In combination, a shaft seal comprising a rotatable member, a housing enclosing a part of said rotatable member, an annular outwardly sloping wedge member affixed to said rotatable member and arranged for rotation therewith, a compressible sealing ring, slidable holding means for said sealing ring positioning said sealing ring in spaced concentric relation to said sloping wedge member and normally maintaining said sealing ring out of engagement with said wedge member, flexible means connected at one end to said holding means and at the other end to said housing, and fluid pressure means positioned adjacent said flexible means for expanding the latter and thereby pulling said sealing ring into engagement with said sloping wedge member.

2. A combination according to claim 1 wherein said holding means comprises a cylindrical member adapted for actuation longitudinally of said shaft for moving said sealing ring into engagement with said wedge member.

3. A combination according to claim 1 wherein spring means bears at one end against said housing and at the other end against said holding means for maintaining said sealing ring out of engagement with said wedge member.

4. The combination according to claim 1 wherein said fluid pressure means comprises an elastic tube having an outlet fitting adapted for connection to a source of fluid supply.

5. A combination according to claim 1 wherein said flexible means comprises an elastic annular member.

No references cited.